United States Patent
Braune

(10) Patent No.: US 7,325,869 B2
(45) Date of Patent: Feb. 5, 2008

(54) AUTOMOBILE SEAT

(75) Inventor: Andreas Braune, Bückeburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 11/042,673

(22) Filed: Jan. 25, 2005

(65) Prior Publication Data

US 2005/0179305 A1    Aug. 18, 2005

(30) Foreign Application Priority Data

Feb. 12, 2004    (DE) ...................... 10 2004 006 873

(51) Int. Cl.
*B60N 2/42* (2006.01)

(52) U.S. Cl. .......................... 297/216.12; 297/216.13; 297/216.14

(58) Field of Classification Search ........... 297/216.12, 297/216.13, 216.14
See application file for complete search history.

(56) References Cited

U.S. PATENT DOCUMENTS 6,033,018 A * 3/2000 Fohl ....................... 297/216.13
6,749,256 B1 * 6/2004 Klier et al. ............ 297/216.12
6,779,840 B1 * 8/2004 Farquhar et al. .... 297/216.12 X

FOREIGN PATENT DOCUMENTS

| DE | 1 9924236 | 10/2000 |
| DE | 100 60764 C1 | 12/2000 |
| DE | 1 0047406 | 4/2002 |
| DE | 1 0228675 | 8/2003 |
| FR | 2824799 | 11/2002 |

* cited by examiner

*Primary Examiner*—Anthony D. Barfield
(74) *Attorney, Agent, or Firm*—Bourque and Associates

(57) ABSTRACT

An automobile seat possesses a seat back that includes a seat back frame to which an restraining device for a headrest is mounted. The headrest may be displaced from an initial position into an extended position against the head of the seat occupant. A locking process is provided by means of which the restraining device may be maintained in its extended position with respect to the seat back frame. The locking process device includes an engaging element pretensioned by a spring that may engage with the engagement recess formed on the restraining device. The locking process device includes a disengaging element to be operated by the seat occupant or other person that brings the engaging element out of engagement with the engaging recess in the maintained condition of the restraining device against the force of the spring.

9 Claims, 11 Drawing Sheets

AUTOMOBILE SEAT

TECHNICAL FIELD

The invention relates to an automobile seat and more particularly, to an active or moveable headrest for a seat such as an automobile seat.

BACKGROUND INFORMATION

An automobile seat of the type disclosed in (FR 2 824 799) includes a so-called active headrest by means of which the headrest is moved against the head of the seat occupant during a rear-end collision involving the automobile in order to prevent the head from being subject to strong acceleration and striking the headrest. With the help of a locking process device, the headrest may be locked in its extended position thus preventing the headrest from returning to its initial position due to a rearward moving impact of the head.

In FR 2 824 799, release of an extended headrest occurs by means of a pre-tensioning element that works with a blocking device that may be released upon limiting acceleration so that the pre-tensioning element brings the restraining device or the headrest to its extended position. The locking process device by means of which the headrest is arrested in the extended position is formed by an engaging element that may be engaged by means of a pre-tensioning spring with an engaging recess.

Another active headrest is known from DE 100 60 764 C1. In this design, the headrest or restraining device is brought from its initial position into the extended position not by means of a pre-tensioning element, but rather by means of pressure element positioned in the seat back area. This pressure element is actuated by the back of the seat occupant moving rearward during a rear-end collision. The locking process of the restraining device and the headrest in the extended position results from an articulated lever design.

Further, DE 102 28 675 C1 reveals a pressure-actuated active headrest system in which the headrest may be arrested in its extended position. This locking is by means of engaging elements facing each other, whereby one of the engaging elements is mounted elastically. When the head strikes the headrest because of a rear-end collision, the elastic element is deformed so that the engaging elements engage with each other. If the force exerted by the head is not sufficient, the elastic element provides a return force so that the engaging elements become disengaged. The design described in DE 102 28 675 C1 provides for automatic release of the lock.

The disadvantage in the prior art headrest systems a disclosed in FR 2 824 799 or DE 100 60 764 C1 is the fact that arrestment of the headrest in its extended position is not reversible. Expensive de-installation or repair of the seat is required in order to release the lock, i.e., in order to make the seat suitable for normal use.

The disadvantage of the design per DE 102 28 675 C1 is that the period of time during which the headrest is locked may be too short. Also, reliable locking may also depend on the angle at which the head impacts the headrest.

Based on this state of the art, it is the one object of the invention to provide a headrest system of the known type so that reliable locking of the headrest in its extended position is possible, and also so the system is easy to repair.

SUMMARY

The present invention features an automobile seat which possesses a seat back that includes a seat back frame to which an restraining device for a headrest is mounted. The headrest may be displaced from an initial position into an extended position against the head of the seat occupant. A locking process is provided by means of which the restraining device may be maintained in its extended position with respect to the seat back frame. The locking process device includes an engaging element pre-tensioned by a spring that may engage with the engagement recess formed on the restraining device. The locking process device includes a disengaging element to be operated by the seat occupant or other person that brings the engaging element out of engagement with the engaging recess in the maintained condition of the restraining device against the force of the spring.

The engaging element may be disengaged from the engaging recess against the force of the spring by means of the unlocking element. Since the unlocking element may be actuated by service personnel, it is no longer necessary to de-install the headrest after it has been locked in the extended position. Moreover, actuation of the unlocking element can release the lock so that the headrest may be returned from its extended position to its initial one, and thus the automobile seat may again be used.

It is important to note that the present invention is not intended to be limited to a device or method which must satisfy one or more of any stated or implied objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
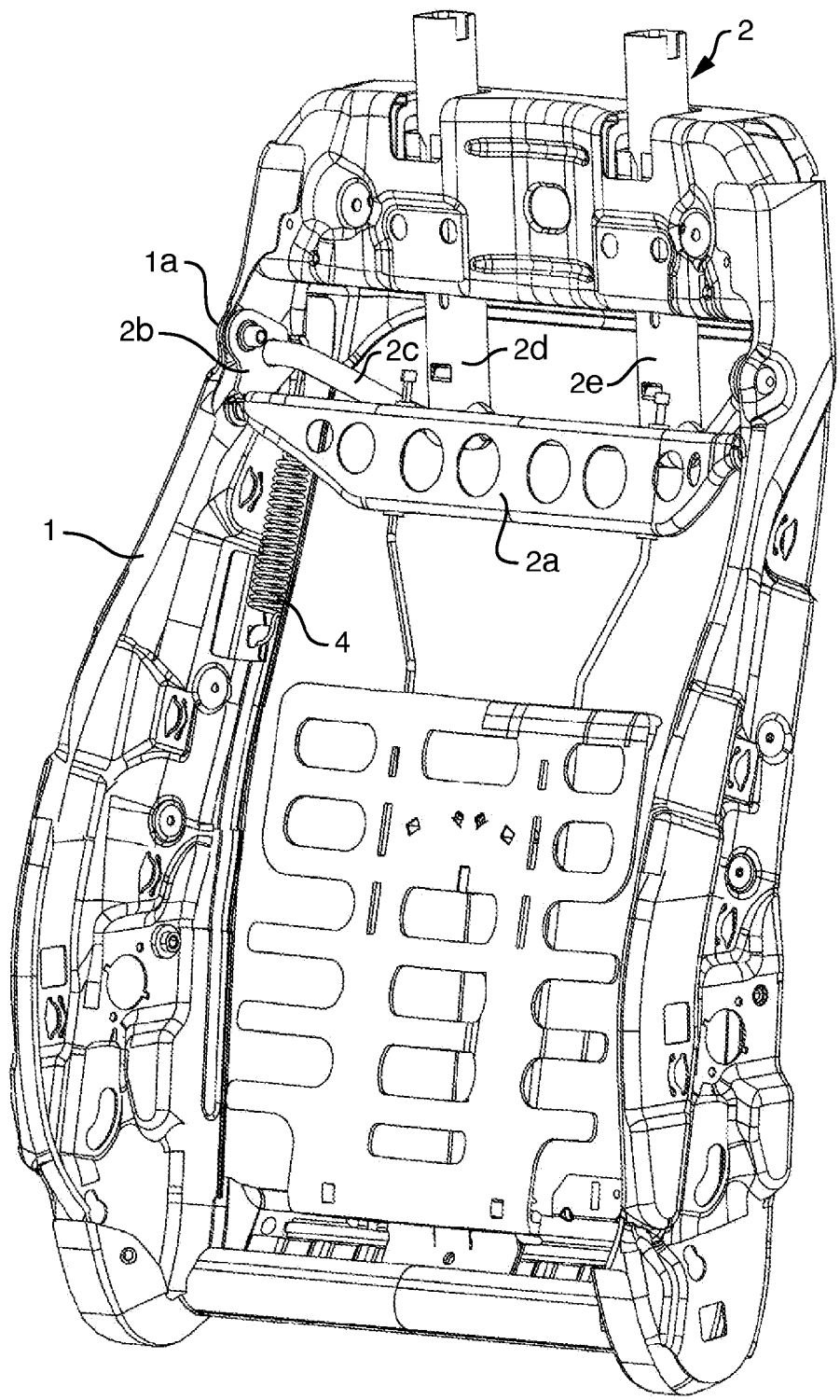
FIG. 1 perspective view of a seat back of an automobile seat whose restraining device is in the initial position.
Figure 2:
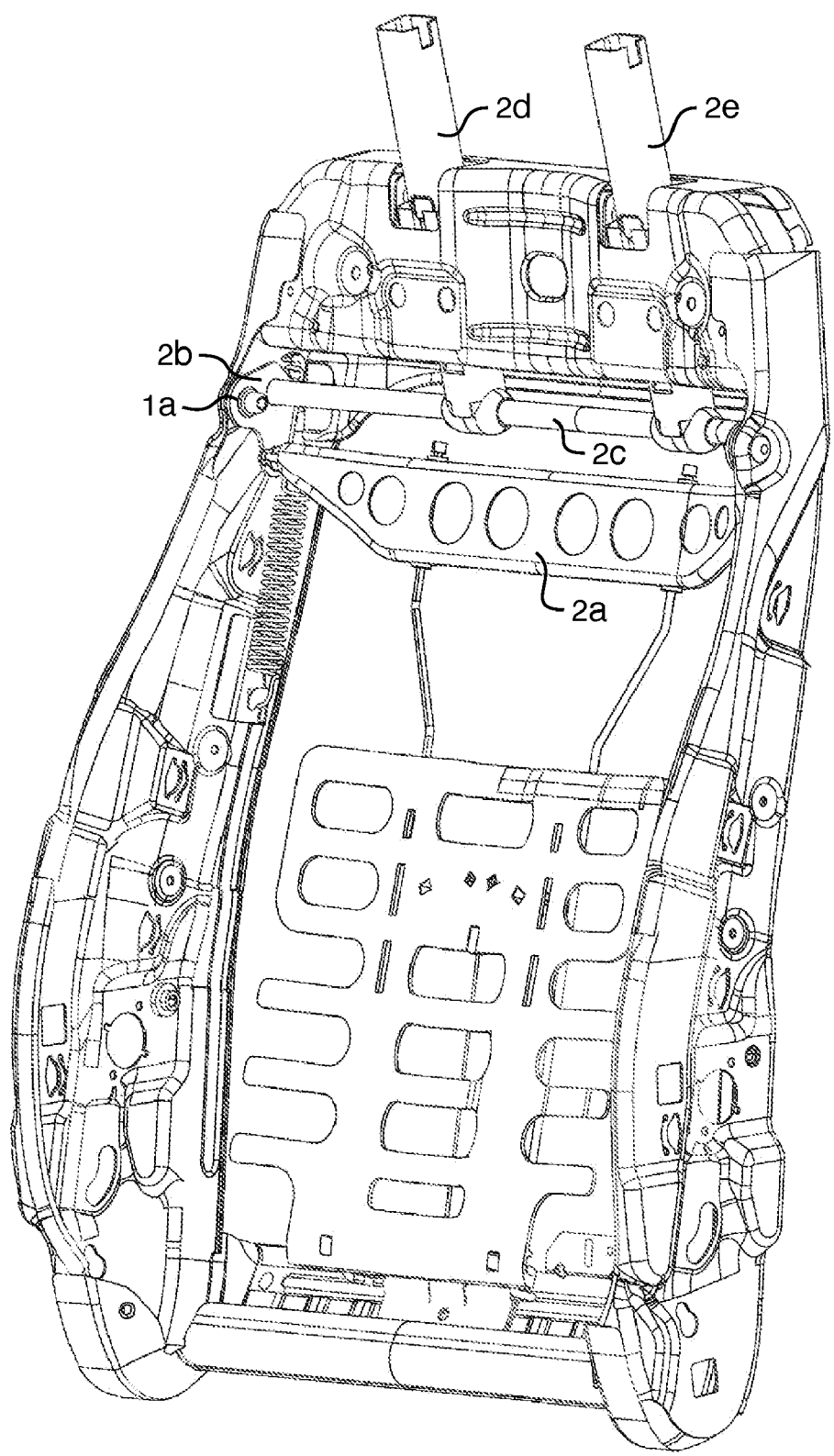
FIG. 2 is a view as in FIG. 1 whereby the restraining device is in an extended position.

FIG. 1 shows the seat back frame 1 of a seat back of an automobile seat. A restraining device designated 2 for a headrest (not shown) is in the upper area of the seat back frame 1. The restraining device 2 includes a plate-shaped pressure element 2a that is mounted laterally on swivel plates 2b that may be swiveled about a pivot axis 1a. A crank 2c is mounted on bearings at the swivel plates 2b to which in turn two headrest tubes 2d and 2e are positioned to guide the headrest rods of the headrest (not shown). Pressure on the pressure element 2a causes the swivel plates 2b to pivot about the pivot axis 1a so that the headrest tubes 2d and 2e are displaced from the initial position shown in FIG. 1 into the extended position shown in FIG. 2.

Figure 3:
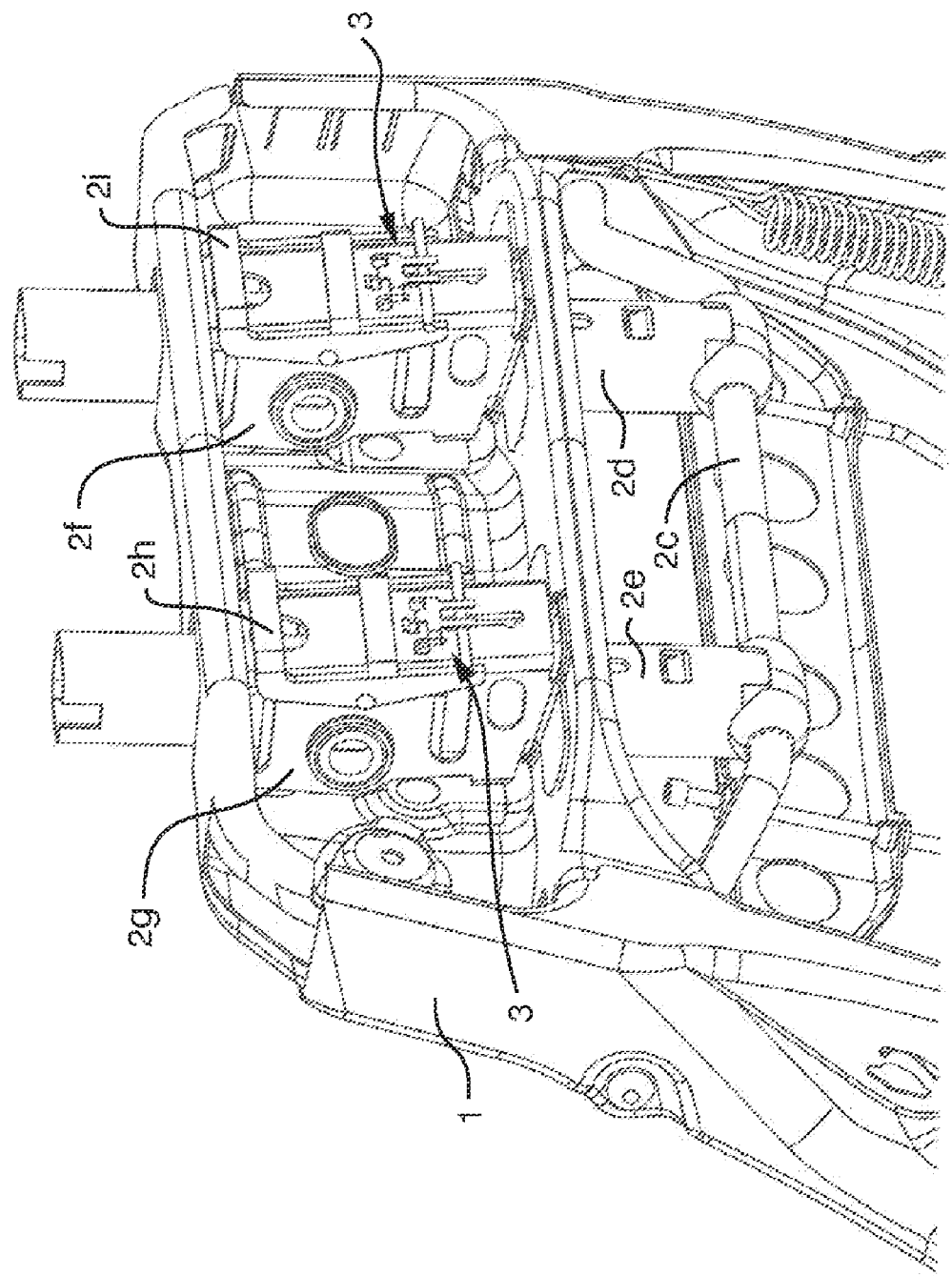
FIG. 3 is an oblique perspective view of the rear of a seat back as in FIG. 1.

FIG. 3 shows the upper end area of the seat back frame 1. The headrest tubes 2d and 2e, based on the articulated lever 2c, are guided in the upper end area of the seat back frame 1 within two housings 2f and 2g. At these housings, unlocking elements 2h and 2i are provided for all locking devices 3.

Figure 4:
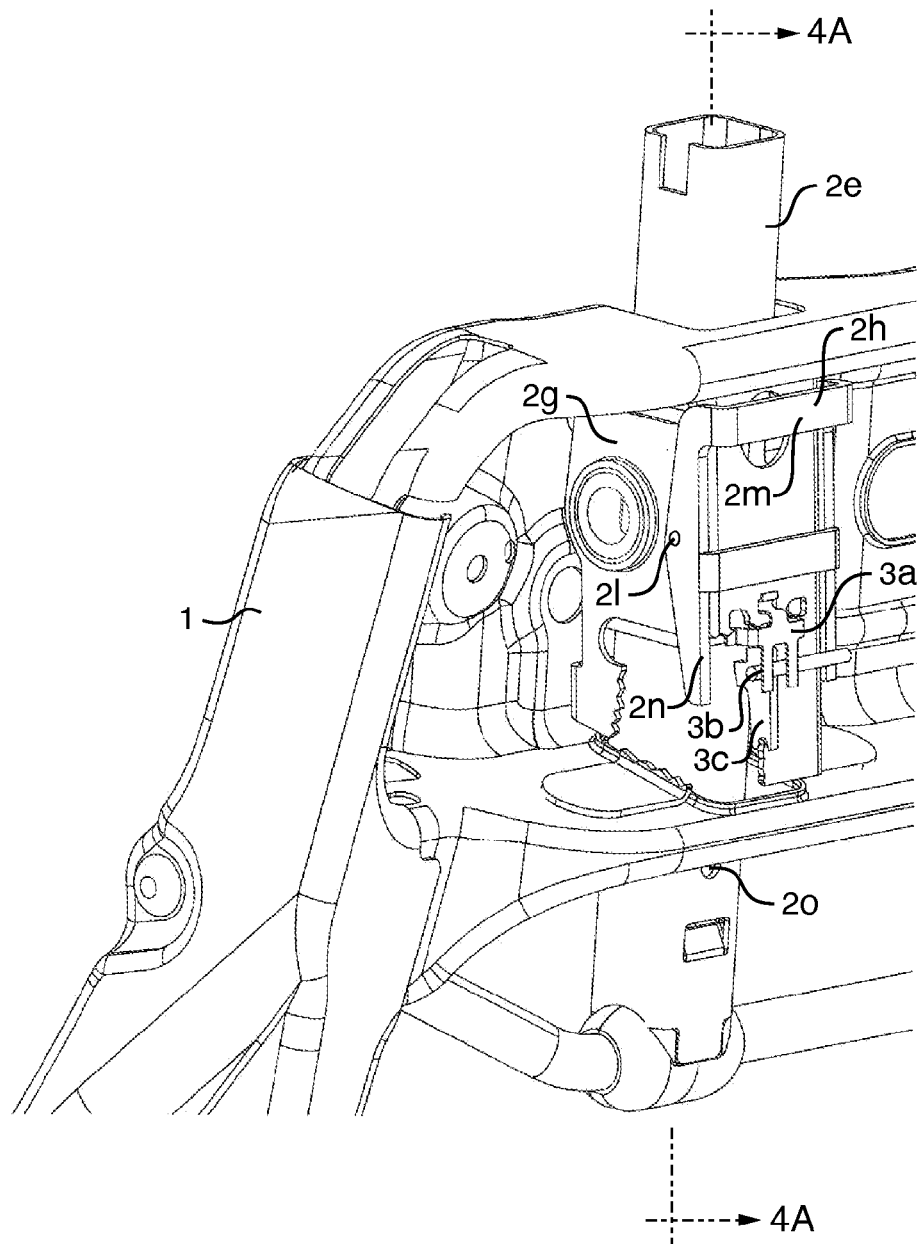
FIG. 4 is a partial view as in FIG. 3 with sectional cutaway view of the locking device.
Figure 4A:
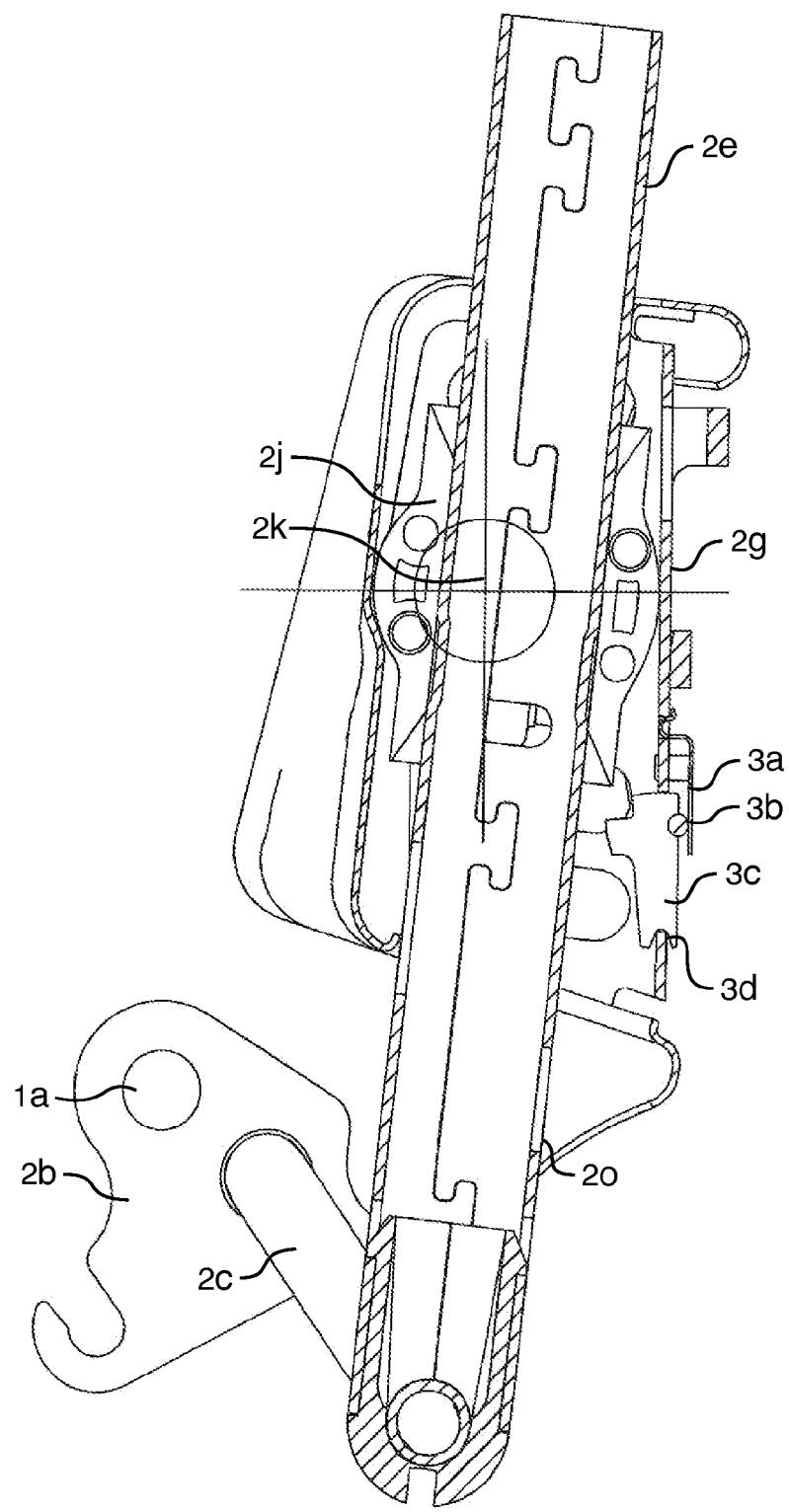
FIG. 4a is a lateral view along line IV-IV in FIG. 4.

With reference to FIGS. 4 and 4a, the following describes in greater detail the locking device 3 as well as the mount for the headrest tubes 2d and 2e on the example of the headrest tube 2e. The lower end of the headrest tube 2e is mounted to the articulated lever 2c. In an upper area, the headrest tube 2e is guided into a bearing body 2j pivotable about a pivot axis 2k so that it may be displaced. Thus, the bearing body 2j forms a rotating and pushing link.

A spring 3a is mounted on the housing 2g that presses the engaging element 3c toward the headrest tube 2e via a stud 3b. The engaging element 3c is mounted on a mount point so that it may pivot.

The unlocking element 2h is shaped as a rocker, and is mounted on the housing 2g to be pivotable about a horizontal axis 2l. The unlocking element 2h includes an actuation section 2m. Pressure on the actuation section 2m allows the unlocking element 2h to pivot about the axis 2l. An unlocking section 2n is provided on the end of the unlocking element 2 opposite from the actuation section 2m that grips the studs 3b so that pressure on the actuation section 2m may cause the stud 3b and the engaging element 3c firmly attached to it to be displaced away from the headrest tube 2e against the force of the spring 3a.

Figure 5:
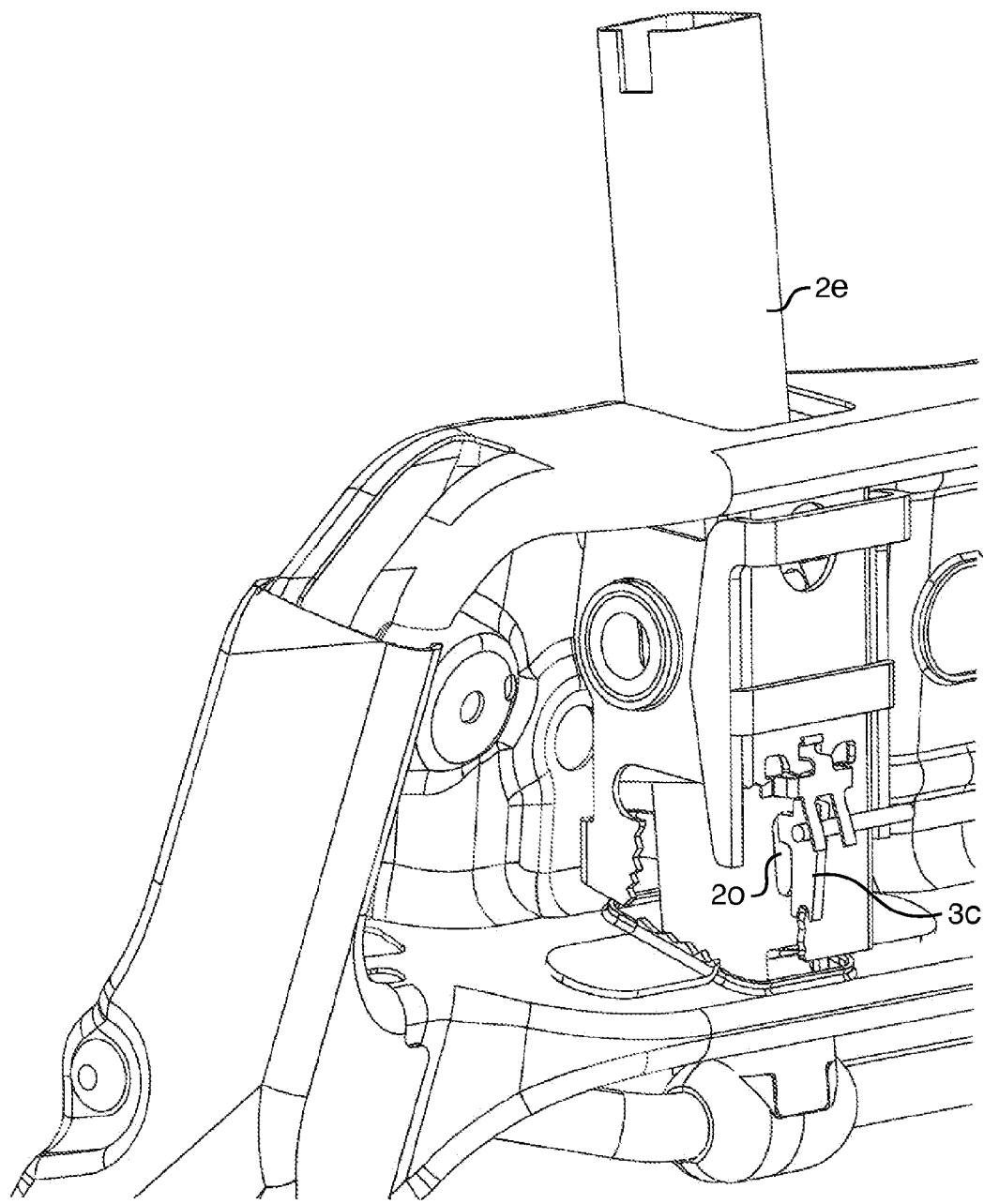
FIG. 5 is a view as in FIG. 4 whereby the restraining device is almost in its completely-extended position.

With reference to FIG. 5, the headrest tube 2e is shown in its almost fully extended position. The engaging element 3c is located just barely out of engagement with a engaging recess 2o formed in the headrest tube as a longitudinal hole.

Figure 6:
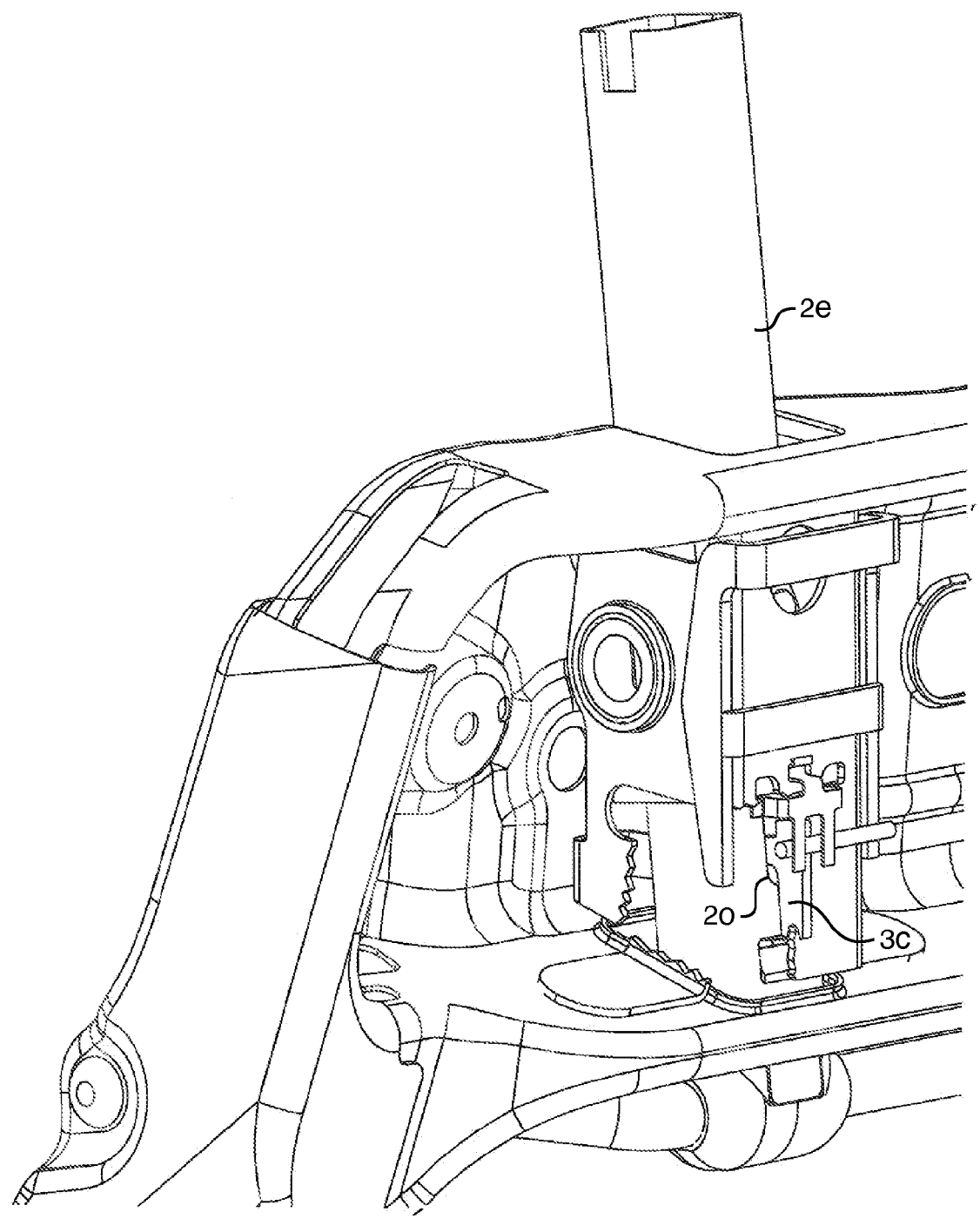
FIG. 6 is a view as in FIG. 5 whereby the locking device is in locked condition.

In the condition represented in FIG. 6, the engaging element 3c is finally engaged with the engaging recess 2o of the headrest tube 2e.

Figure 7:
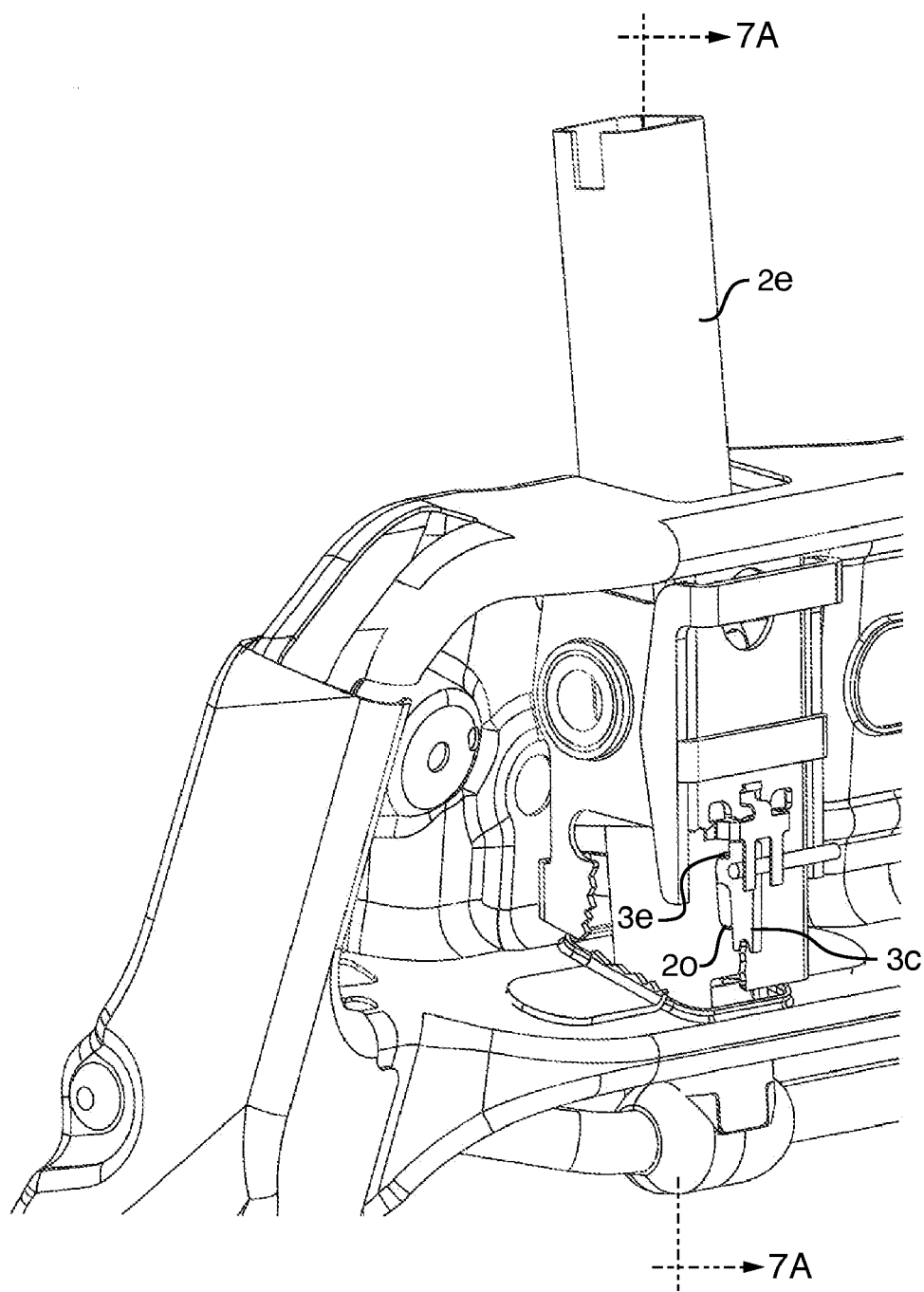
FIG. 7 is a view as in FIG. 6 whereby the locking device is in a limiting position.
Figure 7A:
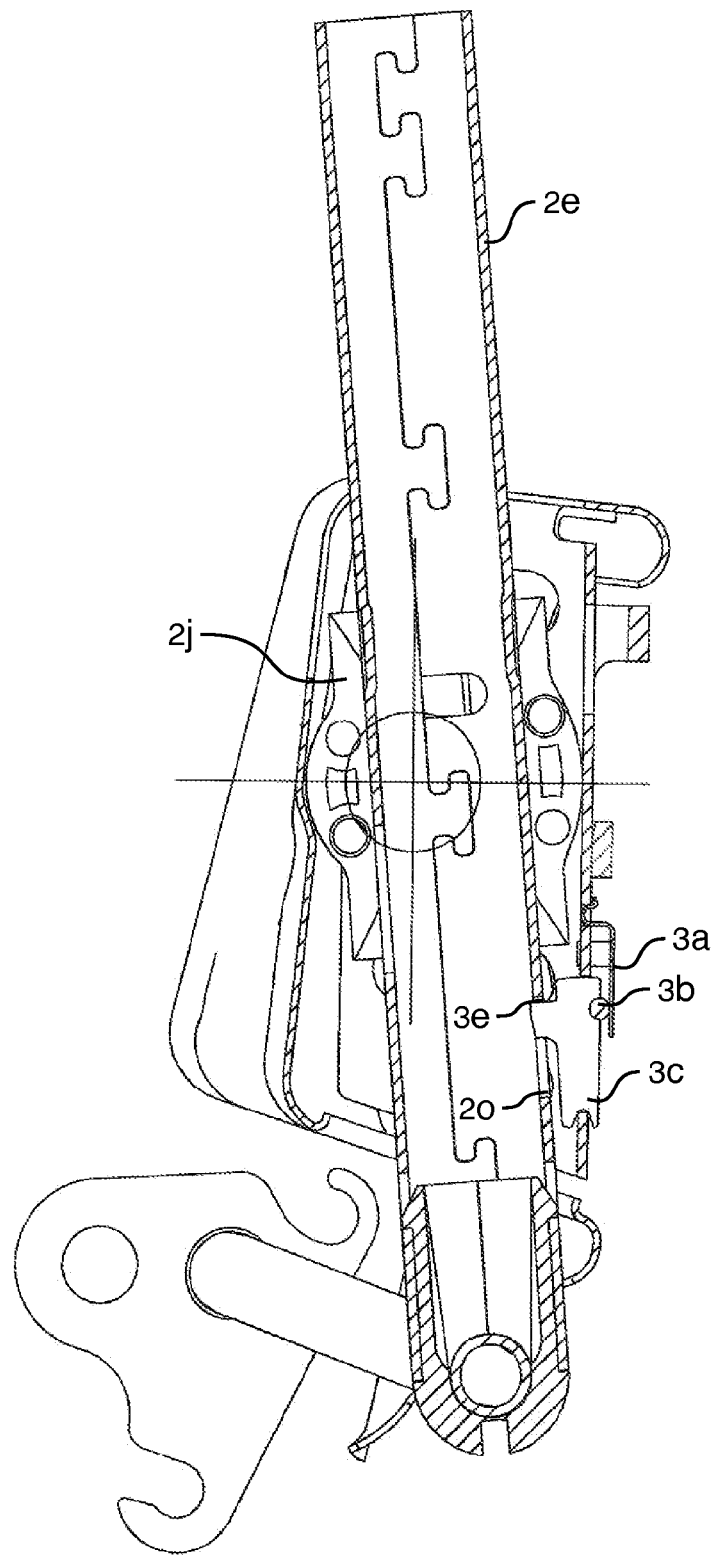
FIG. 7a is a lateral view along line VII-VII in FIG. 7.

FIGS. 7 and 7a show the headrest tube 2e partially retracted with respect to the position shown in FIG. 6 so that an upper contact area 3e of the engaging element 3c is resting against the upper edge of the engaging recess 2o of the headrest tube 2e. Retraction of the headrest tube 2e from the position shown in FIG. 6 to that shown in FIG. 7 results via a return spring 4 shown in FIG. 1, among others, that is attached to a holding section 4a of the swivel plate 2b.

Figure 8:
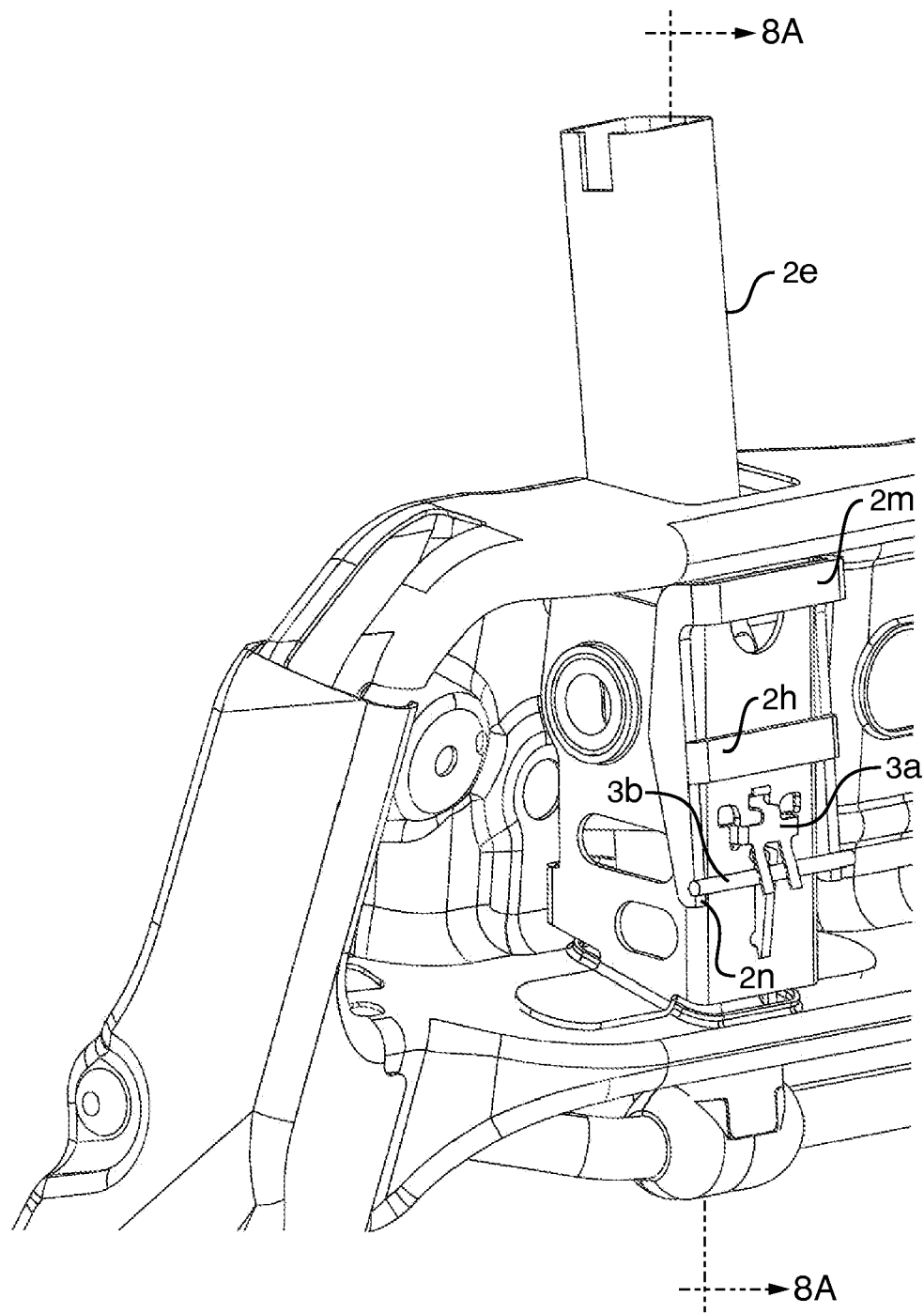
FIG. 8 a view as in FIG. 6 whereby the locking device is in an actuated position.
Figure 8A:
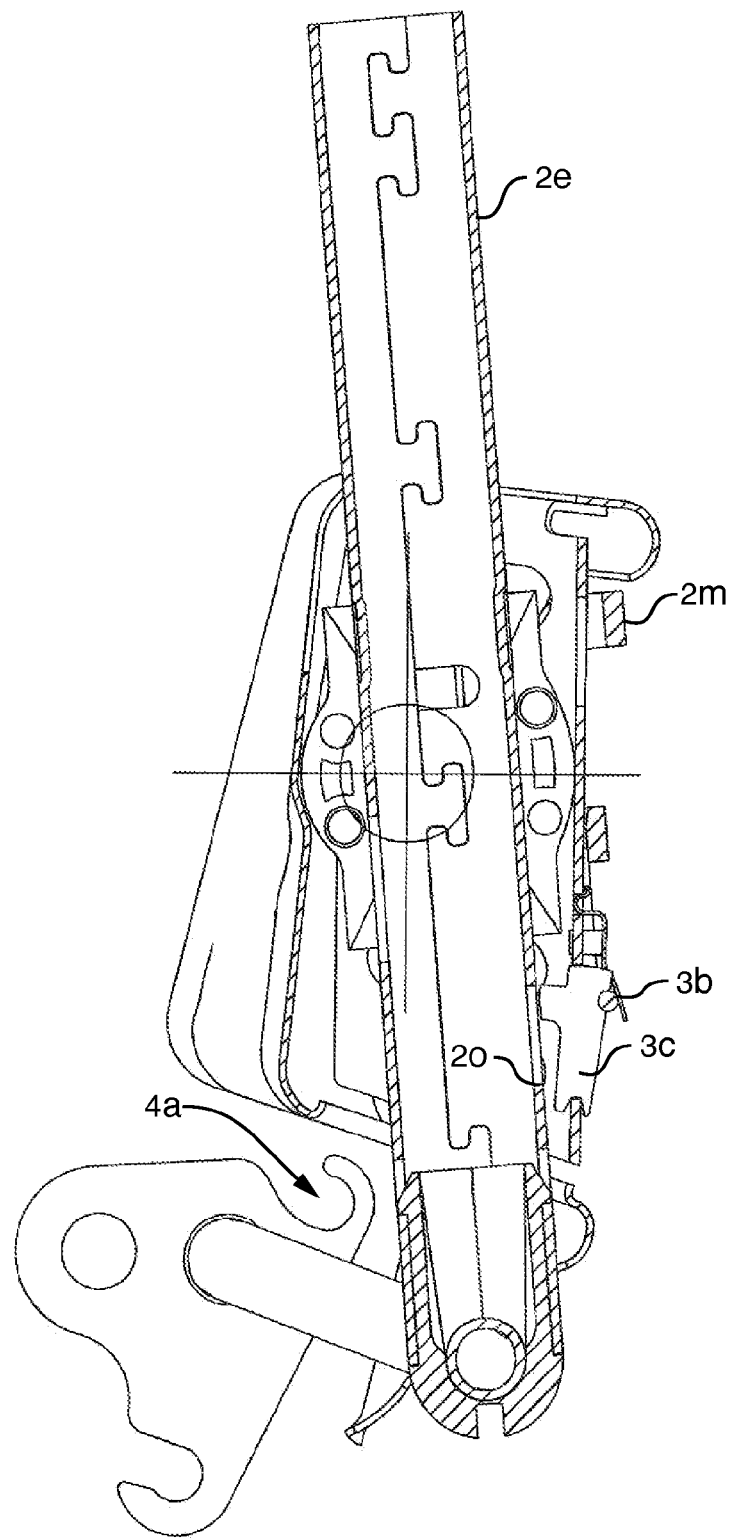
FIG. 8a is a lateral view along line VIII-VIII in FIG. 8.

With reference to FIG. 8 and 8a, one may see how the engaging element 3c is removed from engagement with the engaging recess 2o of the headrest tube 2e by pressure on the actuation section 2m of the unlocking element 2h. The unlocking section 2n thus raises the stud 3b and the engaging recess 3c attached to it from the engaging recess 2o against the force of the spring 3a.

The unlocking elements 2h and 2i are covered by seat material or a seat cover. The servicing person may exert force on the actuation element 2m through the seat material or seat cover so that the locking device 3 may be retracted from the locked condition into an unlocked condition without de-installation of the automobile seat. Thus, the restraining device 2 may be retracted from an extended position into the initial position with the help of the return spring 4.

As mentioned above, the present invention is not intended to be limited to a device or method which must satisfy one or more of any stated or implied objects or features of the invention and should not be limited to the preferred, exemplary, or primary embodiment(s) described herein. Modifications and substitutions by one of ordinary skill in the art are considered to be within the scope of the present invention, which is not to be limited except by the following claims.

The invention claimed is:

1. An automobile seat with a seat back that includes a frame to which a restraining device is mounted for a headrest, whereby the headrest may be displaced from an initial position into an extended position against the head of a seat occupant, whereby a locking device is provided by means of which the restraining device in the extended position of the headrest may be affixed to the seat back frame, whereby the locking device includes an engaging element pretensioned against a spring that engages the engaging element with an engaging recess on the restraining device, characterized in that the locking device includes an unlocking device that may be actuated by service personnel that, when actuated in the locked position of the restraining device, brings the engaging element out of engagement with the engaging recess against the force of the spring, and wherein the restraining device includes headrest tubes to guide headrest rods of the headrest, whereby slots are provided in the headrest tubes that extend in the longitudinal direction of the headrest tubes that form an engaging recess.

2. The automobile seat as in claim 1, wherein the unlocking element is mounted on the seat back frame.

3. The automobile seat as in claim 1 wherein the unlocking element is mounted so that it may pivot.

4. The automobile seat as in claim 1 wherein the unlocking element includes an actuation section that may be actuated by service personnel.

5. The automobile seat as in claim 1 wherein the unlocking element includes an actuation section that works together with the engaging element or with components connected to it.

6. The automobile seat as in claim 1 wherein the unlocking element is formed as a rocker.

7. The automobile seat as in claim 1 wherein the restraining device is mounted to the seat back frame so that it may pivot, and is connected with pressure elements, whereby pressure on the pressure elements by the seat occupant may cause the restraining device to pivot for the purpose of allowing an extending motion.

8. The automobile seat as in claim 7, wherein a return spring is provided to retract the headrest from an extended position to the initial position.

9. The automobile seat as in claim 1 wherein the restraining device is held in its initial position by a blocking device against the force of a pre-tensioning element, whereby the blocking device may be released by exceeding a threshold acceleration for an extending motion of the headrest with the help of the pre-tensioning element.

* * * * *

UNITED STATES PATENT AND TRADEMARK OFFICE
CERTIFICATE OF CORRECTION

PATENT NO. : 7,325,869 B2  Page 1 of 1
APPLICATION NO. : 11/042673
DATED : February 5, 2008
INVENTOR(S) : Andreas Braune It is certified that error appears in the above-identified patent and that said Letters Patent is hereby corrected as shown below:

Title page, item [73] delete
"Assignee: Faurecia Autositze GmbH & Co. KG., Nordsehler StraBe 38, 31655 Stadhagen, GERMANY fifty percent (50%)" and insert --Assignee: Volkswagen AG, D-38436 Wolfsburg, GERMANY fifty percent (50%)--

Signed and Sealed this

Eleventh Day of November, 2008

JON W. DUDAS
*Director of the United States Patent and Trademark Office*